(12) United States Patent
Demaine

(10) Patent No.: US 9,020,537 B2
(45) Date of Patent: Apr. 28, 2015

(54) SYSTEMS AND METHODS FOR ASSOCIATING VIRTUAL CONTENT RELATIVE TO REAL-WORLD LOCALES

(71) Applicant: Experience Proximity, Inc., Los Angeles, CA (US)

(72) Inventor: Windsor K. Demaine, Hollywood, CA (US)

(73) Assignee: Experience Proximity, Inc., Los Angeles, CA (US)

(*) Notice: Subject to any disclaimer, the term of this patent is extended or adjusted under 35 U.S.C. 154(b) by 0 days.

(21) Appl. No.: 13/930,876

(22) Filed: Jun. 28, 2013

(65) Prior Publication Data

US 2014/0004885 A1  Jan. 2, 2014

Related U.S. Application Data

(60) Provisional application No. 61/665,596, filed on Jun. 28, 2012, provisional application No. 61/781,212, filed on Mar. 14, 2013.

(51) Int. Cl.
*H04W 4/02* (2009.01)
*G06F 3/01* (2006.01)
(Continued)

(52) U.S. Cl.
CPC .............. *H04W 4/026* (2013.01); *G06F 3/016* (2013.01); *G06F 17/3087* (2013.01);
(Continued)

(58) Field of Classification Search
CPC ..... H04L 67/18; H04L 12/5865; H04L 51/20; G06F 17/30241; G06F 17/3087; G06F 17/30041; G06F 17/30047; G06F 3/011; G06F 3/0481; H04M 1/72572; H04M 2250/12; H04M 2250/52; H04W 4/02; H04W 4/026; H04W 4/04; H04W 4/185; G01C 21/20; G06Q 30/02; G06Q 30/0207; G06Q 30/0281; G06Q 30/0601; G06Q 30/0639; G06Q 90/20
USPC .............................................. 455/456.1–457
See application file for complete search history.

(56) References Cited

U.S. PATENT DOCUMENTS 6,222,583 B1 * 4/2001 Matsumura et al. .......... 348/113
6,782,253 B1 * 8/2004 Shteyn et al. .............. 455/414.1
(Continued)

FOREIGN PATENT DOCUMENTS

EP   2393056 A1   12/2011

OTHER PUBLICATIONS

International Search Report and Written Opinion mailed Oct. 21, 2013 in International Patent Application No. PCT/US2013/048662 filed Jun. 28, 2013 (9 pages).

*Primary Examiner* — Matthew Sams
(74) *Attorney, Agent, or Firm* — Goodwin Procter LLP

(57) ABSTRACT

Aspects of the invention provide techniques and systems for delivering geographically-relevant content to a mobile device. Geolocation and orientation data is taken from the mobile device, including directional orientation and a vertical angle of the mobile device as it is being pointed at a physical locale. Based on the geolocation and orientation data, an angular field of view is identified relative to a real-world coordinate system. Geospatial data describing the field of view is transmitted to a central server, which, based on geospatial coordinates of pre-defined virtual locales identifies the spatially corresponding virtual locale(s) and sends spatial definitions and structurally-organized content related to the virtual locale(s) back to the device. Users provide input signals to the mobile device to indicate navigational commands related to the content, and the display of the content on the device is iteratively updated based on the input signals and detected changes in the geolocation and orientation data of the device.

20 Claims, 7 Drawing Sheets

(51) Int. Cl.
  *G06F 17/30* (2006.01)
  *H04M 1/725* (2006.01)
  *H04M 3/42* (2006.01)
  *H04N 21/258* (2011.01)
  *H04W 4/20* (2009.01)

(52) U.S. Cl.
  CPC ..... *H04M 1/72572* (2013.01); *H04M 3/42348* (2013.01); *H04N 21/25841* (2013.01); *G06F 2221/2111* (2013.01); *H04M 2242/15* (2013.01); *H04M 2250/12* (2013.01); *H04M 2250/22* (2013.01); *H04W 4/206* (2013.01)

(56) References Cited

U.S. PATENT DOCUMENTS

| | | | |
|---|---|---|---|
| 7,689,473 B2 * | 3/2010 | Borom et al. | 705/26.1 |
| 8,180,396 B2 * | 5/2012 | Athsani et al. | 455/557 |
| 8,280,405 B2 * | 10/2012 | Sanz-Pastor et al. | 455/456.2 |
| 2001/0041561 A1 * | 11/2001 | Ventulett et al. | 455/414 |
| 2002/0062246 A1 * | 5/2002 | Matsubara | 705/14 |
| 2002/0140745 A1 * | 10/2002 | Ellenby et al. | 345/848 |
| 2002/0167536 A1 * | 11/2002 | Valdes et al. | 345/633 |
| 2003/0142797 A1 * | 7/2003 | Troy et al. | 379/88.12 |
| 2004/0225433 A1 * | 11/2004 | Burt | 701/200 |
| 2007/0027903 A1 * | 2/2007 | Evans et al. | 707/102 |
| 2007/0162942 A1 * | 7/2007 | Hamynen et al. | 725/105 |
| 2008/0248815 A1 | 10/2008 | Busch | |
| 2009/0005076 A1 | 1/2009 | Forstall et al. | |
| 2009/0081959 A1 * | 3/2009 | Gyorfi et al. | 455/70 |
| 2010/0204914 A1 | 8/2010 | Gad et al. | |
| 2011/0161875 A1 * | 6/2011 | Kankainen | 715/810 |
| 2011/0214082 A1 * | 9/2011 | Osterhout et al. | 715/773 |
| 2011/0242090 A1 * | 10/2011 | Keating et al. | 345/419 |
| 2012/0130796 A1 | 5/2012 | Busch | |
| 2012/0225663 A1 * | 9/2012 | Gupta et al. | 455/456.1 |
| 2013/0073988 A1 * | 3/2013 | Groten et al. | 715/753 |
| 2013/0321466 A1 * | 12/2013 | Kocienda | 345/635 |

* cited by examiner

SYSTEMS AND METHODS FOR ASSOCIATING VIRTUAL CONTENT RELATIVE TO REAL-WORLD LOCALES

CROSS-REFERENCE TO RELATED APPLICATIONS

This application claims priority to and the benefit of U.S. Provisional Patent Application Ser. Nos. 61/665,596 and 61/781,212, filed on Jun. 28, 2012, and Mar. 14, 2013, which are hereby incorporated herein by reference in their entirety.

FIELD OF THE INVENTION

The invention relates generally to the association of World-Wide Web content with a physical locale, and more specifically to the use of a wireless mobile device to evaluate real-world locations through interaction with co-located three-dimensional virtual locales triggering the display of web-based content associated with that physical locale.

BACKGROUND

Mobile, wireless communication devices have become ubiquitous in the everyday life of consumer and workers. While initially designed to replace the standard telephone, devices now have similar, if not more functionality than desktop computers. For example, in addition to telephone service and email, today's devices allow users to capture images and video, use complex applications, play games, and purchase goods and services.

These mobile devices and communications networks that support them have long been used to deliver information relating to businesses to end users. Such information includes, among other things, directory information and information relating to products and services such as, for example, advertisements of various types. Many mobile communications networks are additionally aware of end-users' geospatial location in real-time, as well as users' demographic information and online activities, and can use this information to target advertisements to a consumer.

However, most purchases and activities are driven first by a consumer, either as part of a deliberate action (looking for a particular item at a particular store) or on impulse (a consumer walks by a store or item and decides to buy it). Moreover, conventional mobile-based advertising is "static" in that an advertisement or other content is delivered to the user, but the user has no ability to manipulate, navigate or otherwise interact with the content. What is needed, therefore, are techniques that allow consumers to impulsively initiate actions and purchases using their mobile devices based on their immediate physical surroundings and do so in an interactive manner.

SUMMARY OF THE INVENTION

Embodiments of the invention provide methods and supporting systems for facilitating the delivery of context-relevant content to a user of a mobile device. In addition to determining the content to be delivered based on the users physical location (using, for example, GPS for outdoor positioning or IPS for indoor positioning), the orientation, direction and movement of the device may also be used. The directional and orientation data may be used to explore a portion of the physical locale through interaction with a spatially co-located virtual locale, defined as two-dimensional planes or three-dimensional volumes using a combination of real-world geospatial coordinates, directionality and distance values relative to the surrounding physical world. As a result, two individuals standing in the same place, but pointing their device in different directions or at a different angle may receive different content. Further, the content may include a collection of content structured in a manner that facilitates navigation of the content as the user manipulates his device. As such, users can interact with the content (e.g., scroll through, drill down, etc.) using haptic interactions with the device fixed on a specific virtual locale or as it is repositioned, reoriented, or moved such that it is directed at a different virtual locale.

As such, one aspect of the invention provides a method for delivering geographically-relevant content to a mobile device that includes receiving geolocation and orientation data from the mobile device, wherein the orientation device includes directional orientation and a vertical angle of the mobile device as it is being pointed at a physical locale. Based on the geolocation and orientation data, an angular field of view is identified relative to a real-world coordinate system. Geospatial data describing the field of view is transmitted to a central server, which, based on geospatial coordinates of pre-defined virtual locales identifies the spatially corresponding virtual locale(s) and sends both spatial definitions, in the form of two-dimensional planes or three-dimensional volumes expressed in relation to the physical world, and structurally-organized content related to the virtual locale(s) back to the device. Users provide input signals in the form of haptic interactions with the mobile device to indicate navigational commands related to the content, and the display of the content on the device is iteratively updated based on the input signals and detected changes in the geolocation and orientation data of the device where user interface elements are displayed triggered by the detected intersection of the device field of view and any virtual locale spatial volume.

In some embodiments, the virtual locale may be a two-dimensional plane, corresponding to a sign, a billboard or a storefront. In other instances, the virtual locale may be a three-dimensional volume corresponding to a building, a landmark, or a naturally-occurring element of the landscape and in other embodiments, the virtual locale may not be related to the physical environment but only defined in relation to the physical environment. The corresponding virtual locales are spatially related to the corresponding physical locales but are not bound to the physical shape.

In certain cases, the virtual locale may include multiple sub-locales, such as in relation to a building with multiple businesses located in the building. In such cases, the structurally-organized content may include information related to each of the sub-locales such that the haptic interactions direct navigation of the content on the mobile device among information related to each of the sub-locales. For example, the structurally-organized content may be organized hierarchically, such that parent nodes at a first level in the hierarchy include top-level content for each of the sub-locales, and child nodes at levels subordinate to the first level include subcontent associated with the each of the sub-locales. The structurally-organized content may include a traversable menu of content such that the haptic interactions cause content elements to be selected from the menu. The content displayed on the device at any one time may be a subset of the total content received at the device from the server.

The haptic interactions may include, for example, sliding a finger vertically along a face of the mobile device, sliding a finger horizontally along the face of the mobile device, touching, moving the device, reorienting the device, assessing the frequency, speed and combination of touches and, after a specified time duration, removing a finger from the face of the mobile device, or maintaining contact between a finger and the face of a mobile device for a period of time greater than the specified time duration.

In another aspect, a system for delivering geographically-relevant content to a mobile device includes a processor for executing computer-executable instructions and a memory for storing the instructions. Upon execution of the instructions by the processor, a content delivery application is instantiated that identifies virtual locales and displays structured content associated with the corresponding physical locale. The application receives geolocation and orientation data from the mobile device, the orientation data including a directional orientation and a vertical angle of the mobile device. Based on the geolocation data and the orientation data, an angular field of view relative to a real-world coordinate system is determined as the mobile device is pointed at a physical locale, and the geospatial data describing the field of view is sent to a central server. In response, the application receives the corresponding virtual locale data such two-dimensional plane or three-dimensional volume definitions and structurally-organized content associated with the physical locale filtered based on a maximum distance criteria calculation between the geospatial data describing the field of view and geospatial coordinates of the virtual locale. In certain cases, additional filters may be used (especially in areas of high locale density) such as a radius of interest, user-specific metadata, time of day etc. and/or a weighting priority factor. The application further receives input signals representing haptic interactions with the mobile device and iteratively updates content displayed on the device based on the haptic interactions and detected changes in the geolocation and orientation data.

In some embodiments, the virtual locale may be a two-dimensional plane, such as in relation to a sign, a billboard or a storefront. In other instances, the virtual local may be a three-dimensional volume, such as in relation to a building, a landmark, or a naturally-occurring element of the landscape.

In certain cases, the virtual locale may include multiple sub-locales, such as a building with multiple businesses located in the building. In such cases, the structurally-organized content may include information related to each of the sub-locales such that the haptic interactions direct navigation of the content on the mobile device among information related to each of the sub-locales. For example, the structurally-organized content may be organized hierarchically, such that parent nodes at a first level in the hierarchy include top-level content for each of the sub-locales, and child nodes at levels subordinate to the first level include subcontent associated with the each of the sub-locales. The structurally-organized content may include a traversable menu of content such that the haptic interactions cause content elements to be selected from the menu. The content displayed on the device at any one time may be a subset of the total content received at the device from the server.

The haptic interactions may include, for example, sliding a finger vertically along a face of the mobile device, sliding a finger horizontally along the face of the mobile device, touching and, after a specified time duration, removing a finger from the face of the mobile device, or maintaining contact between a finger and the face of a mobile device for a period of time greater than the specified time duration.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION OF THE INVENTION

Figure 1:
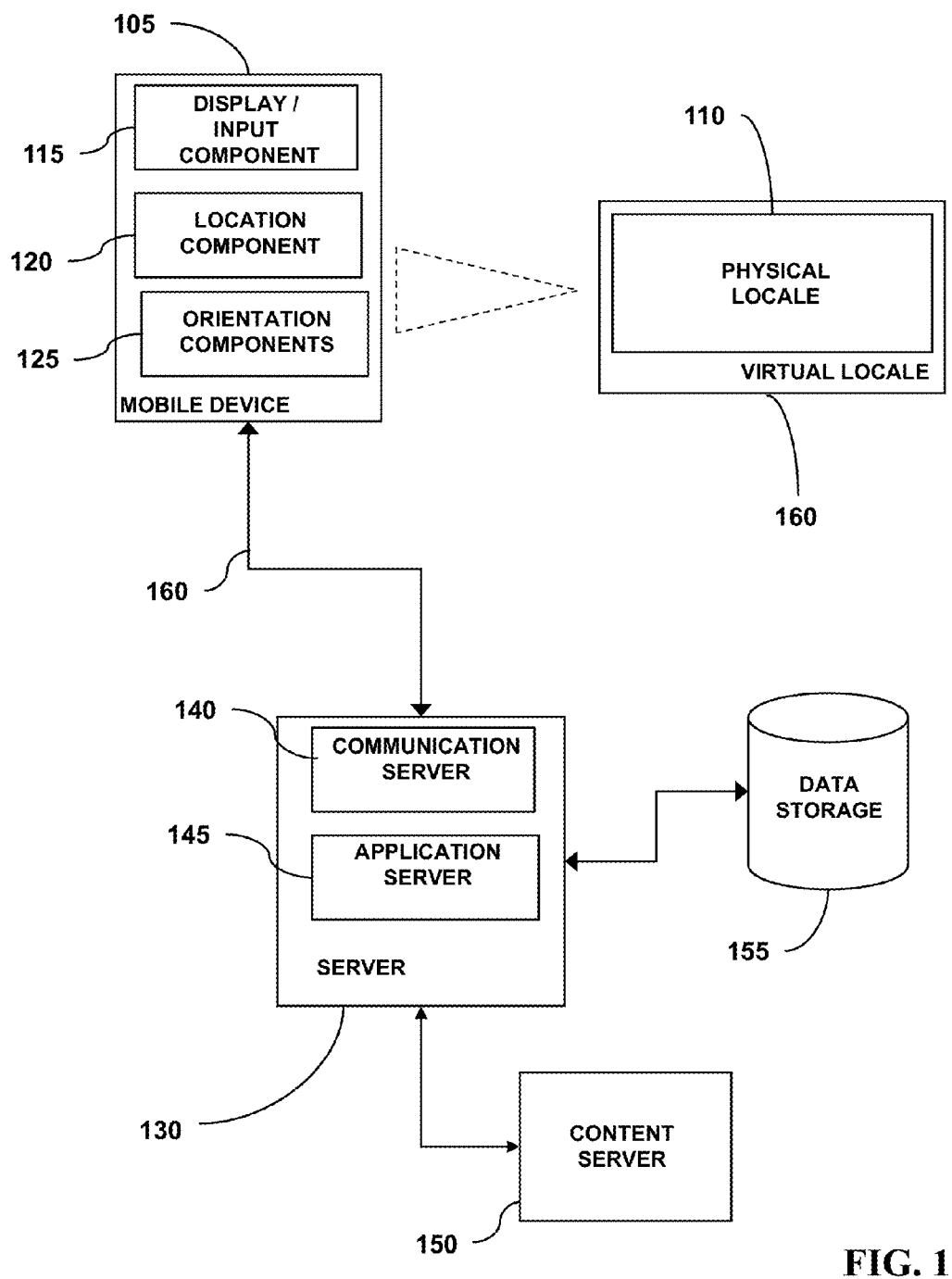
FIG. 1 is a block diagram illustrating a system for retrieving location-based content using a mobile device in accordance with various embodiments of the invention.

The methods and systems described as various embodiments of this invention allow any mobile device to trigger initiation of executable commands within an application when a directional vector, aligned with the orientation of the device and calculated in three dimensional world coordinates in relation to the surrounding physical world, intersects pre-defined planes that have also been defined in three dimensional world coordinates in relation to the surrounding physical world.

As the directional vector crosses into a pre-defined two-dimensional plane or three-dimensional volume, the executable command associated with this plane is transferred to the mobile device. The process may be initiated when the user of the mobile device initiates a native application on the device by depressing the associated user interface icon. Continuing to depress the smart display while changing the orientation of the smart device causes the directional vector, dynamically aligned to the device, to dynamically change its value with relation to the three dimensional world coordinate system in which it is defined. Each time this directional vector spatially intersects with one of the pre-defined two-dimensional planes or three-dimensional volumes, descriptive information associated with this two-dimensional plane or three-dimensional volume is transferred back to the smart device from a remote database (either dedicated to supporting the system or cloud-based). If the user stops depressing the smart display while the directional vector lies within a pre-defined two-dimensional plane or three-dimensional volume then an executable command associated with this plane is transferred to the smart device from the remote database and is executed on the smart device. If the user stops depressing the smart display while the directional vector lies outside all pre-defined two-dimensional planes or three-dimensional volumes then the list describing all previously intersected planes or volumes remains on the display for possible interaction by the user.

As one general example, and as described in greater detail below, a billboard along a busy street may be identified as a pre-defined plane based on its GPS coordinates and direction of placement. The billboard is uniquely identified in a central database in which many planes are defined and stored. In addition, information associated with the billboard is stored in the database. Examples of such information include the company or brand advertising on the billboard, information about the product, venue or event being advertised on the billboard, venues near the billboard, etc. As a user approaches the billboard, the device captures the real world coordinates and directional information and transmits the information to the central server at which the information is compared to the pre-defined planes stored thereon. If a match is found, information associated with the plane is then sent to the device and the user can interact with the content.

FIG. 1 illustrates an exemplary operating environment in which a mobile device 105 (e.g., a mobile telephone, personal digital assistant, smartphone, or other handheld device such as an iPhone or Android-based device) may be used to indicate interest in a physical locale 110 and/or content associated with a physical locale 110. The device 105 may include a display/input component 115 such as a combination display and touchscreen for presenting content to and accepting input commands from the user, and/or in some cases a distinct keypad.

The device 105 may also include one or more location and orientation components 125. Specifically, the device 105 may include a GPS receiver that communicates with GPS satellites to determine a longitude and latitude location of the device, a three-axis accelerometer that measures pitch, roll and yaw movement of the device, a magnetometer that measures directional orientation with respect to the magnetic field of the Earth and potentially a gyroscope to assist in the maintenance of the orientation. In some instances, indoor positioning systems or supporting applications may also be used to determine a location within a mall, stadium, casino, large retail establishment, airport, or other building. Examples of approaches include, for example, WiFi triangulation or fingerprinting, radio beaconing, Bluetooth radios, combining outdoor GPS data with movement and orientation data from the device 105, programmed LED lighting systems, indoor mapping, cellular tower signals, and surveillance camera data.

As a user of the mobile device 105 moves about his physical environment (e.g., walks down a street, through a mall, along a trail, etc.) the user selectively "points" the device 105 at the physical locale 110 of interest to initiate "interactions" with the associated virtual locale 160 to explore content related to the physical locale 110. The physical locale 110 may be a physical object such as a building, billboard, storefront, or a naturally occurring element of landscape (e.g., a lake, beach, mountain, etc.). By standing in a particular location, pointing the device 105 in a particular direction, and tilting the device 105 at an angle with respect to the ground, data may be collected from the location components 120 and orientation components 125 of the device 105 to determine its location and orientation with respect to the real physical world.

The mobile device 105 may be programmed with an application program to transmit geolocation and geospatial data from the device 105 to a server 130. The server 130 may include a communications server platform 140 such as the Apache Web Server, WebSphere from IBM to manage incoming requests from the mobile device 105 and/or application and outbound responses thereto. The server 130 may also include an application server 145 for executing stored application code that implements the methods described herein. A content server 150 and data storage server 155 provide storage for the spatial virtual locale definitions, corresponding structured navigation, related meta data, HTML template layouts, web page elements, electronic content, images, audio and video feeds, user data, advertisements, logging and usage data, as well as other information used to implement, manage and monitor the system. In summary, the server 130 receives geospatial data from the mobile device 105 and based on a match (or near match) between the geospatial data and geospatial data relating to virtual locales, identifies one or more virtual locales that appear to be within the "view" of the device 105. Additional content may be delivered to the device 105 based on such a match such that the user may view and interact with the associated content.

The mobile device 105 and server 130 communicate with each other (as well as other devices and data sources) via a network 160. The network communication may take place via any media such as standard and/or cellular telephone lines, LAN or WAN links (e.g., T1, T3, 56 kb, X.25), broadband connections (ISDN, Frame Relay, ATM), wireless links, and so on. Preferably, the network 160 can carry TCP/IP protocol communications, and HTTP/HTTPS requests made by the mobile device and the connection between the mobile device 105 and the server 130 can be communicated over such networks. In some implementations, the network includes various cellular data networks such as 2G, 3G, 4G, and others. The type of network is not limited, however, and any suitable network may be used. Typical examples of networks that can serve as the communications network 121605 include a wireless or wired Ethernet-based intranet, a local or wide-area network (LAN or WAN), and/or the global communications network known as the Internet, which may accommodate many different communications media and protocols.

Separately from the application residing on the mobile device 105, and using a device that has the capability to report and record three-dimensional position values from a coordinate system defined in relation to the physical world, the position and orientation of two-dimensional planes or three-dimensional volumes are defined as "virtual locales." These spatial definitions can be static, dynamically changing or dynamically defined relative to an object that can move spatially within the three-dimensional physical world. Generally, the defined geospatial coordinates of the virtual locales include longitude and latitude values to pinpoint the critical perimeter locations of two-dimensional planes or three-dimensional volumes as well as an altitude, relative to the ground plane at the specific location, to distinguish multiple virtual locales that may be at the same location and to provide a more accurate intersection with the field of view of the mobile device 105. In some instances, a time element may be stored along with the geospatial data and used as an additional filter to determine the appropriate content for deliver. For example, a billboard may be scheduled to be updated with a new movie advertisement in a week's time, and to avoid having to update the database at the instant the new billboard is visible, a date/timestamp can be used to identify when the system should select one "virtual locale" versus another.

In some instances, especially those in which the density of the virtual locales is low (i.e., there is a significant amount of "white space" between virtual locales) the geospatial data elements that define the virtual locales may be expanded to take up the white space so that the intersection space is larger than the physical dimensions of the physical locale. In some cases, the expansion of the geospatial dimensions includes a set distance (e.g., an additional 20 feet in each direction), whereas in other cases the dimensions are expanded until they "bump up" against other defined virtual locales, effectively filling in all available space. In more specific cases, the entities "owning" or paying for the virtual locales can purchase the additional space to expand the reach of their advertisements and spatial footprint so long as it does not overlap other virtual locales.

The determination of the intersection between the smart device generated field of view and the pre-defined two dimensional planes/three dimensional volumes is based on three dimensional Cartesian calculations assuming that both the directional vector and the two dimensional planes/three dimensional volumes are being defined based on the same real world relative coordinate system. In one embodiment, intersections among shapes or virtual locales residing in close proximity to structural representations of the physical world are calculated as opposed to intersections with shapes or virtual locales aligned with the structural representations themselves. This allows the shape, orientation and position of the recognized "virtual locales" to change over time as they are not fixed to the physical world but rather are defined relative to the physical world.

The techniques described herein are applicable to both indoor and outdoor uses. In cases where indoor use is contemplated, the device uses various sensors capable of calculating the orientation of the device relative to the surrounding physical world including both indoor positioning systems (IPS) and outdoors (GPS). Further, a single device uses intermittent connectivity to remote servers that host the two-dimensional and three-dimensional "virtual locale" definitions related to the surrounding physical world.

IP addresses, URLs, URIs and other content identification information are stored in the server 130. The database holds the relationships between the specific two dimensional planes/three dimensional volumes and the content identification information that is to be returned to the smart device upon intersection of the smart device field of view and the virtual locale spatial definition.

Additional categorical data can be entered into the relational database in order to allow for multiple IP addresses to be assigned to a single two dimensional plane or three dimensional volume. User generated input defining the desired category may be passed form the smart device to further inform the query of the relational database. As a result, the process can be utilized to associate relationships between web pages and fixed locations, trackable moving objects, trackable people etc. with the possible physical locales being either analog or digital objects.

Figure 2:
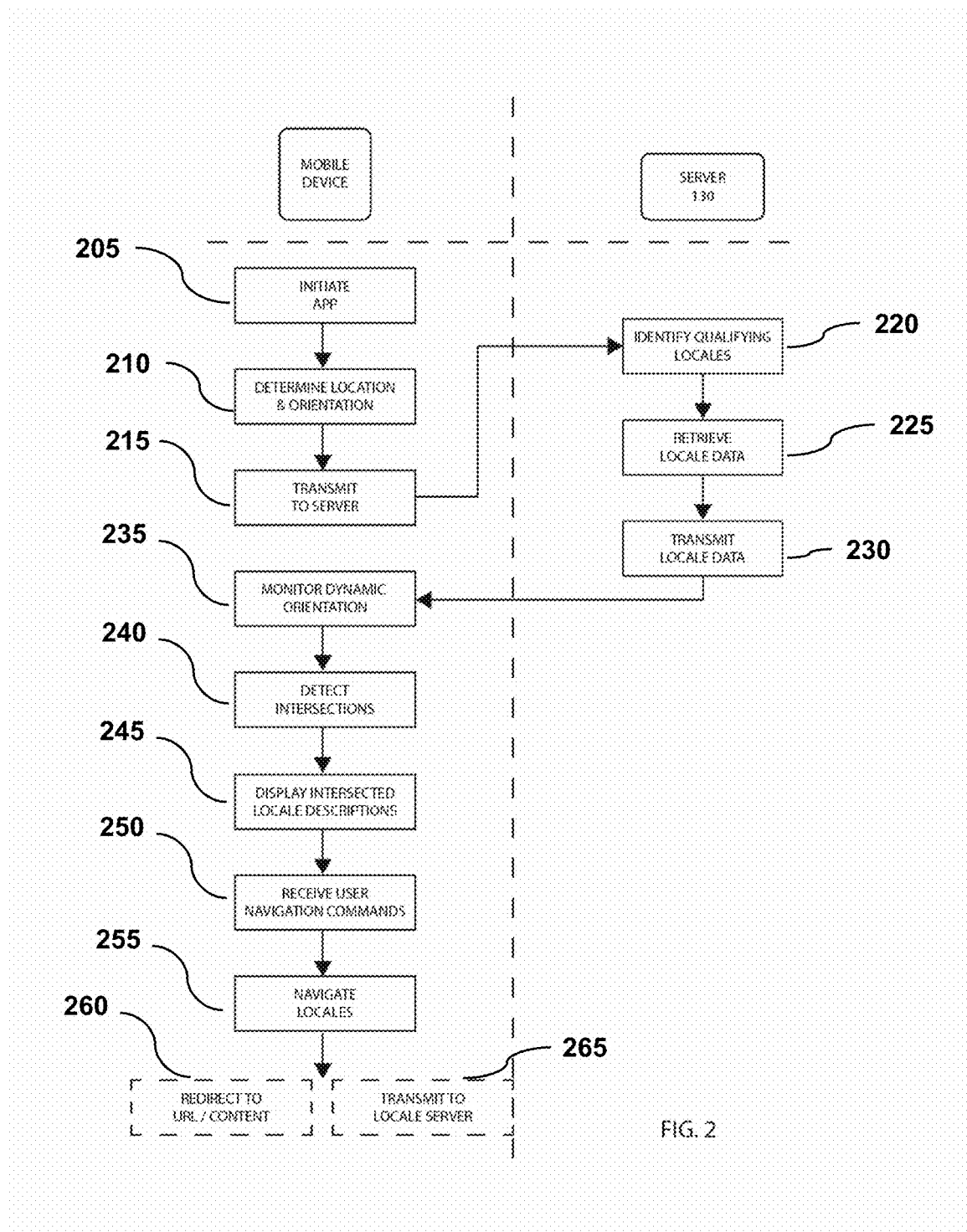
FIG. 2 is a flow chart illustrating a process for retrieving location-based content using a mobile device in accordance with various embodiments of the invention.

FIG. 2 is a flowchart illustrating a process for providing content to a mobile device 105 based on its location and orientation. A user interested in learning more about a physical locale or a product, service or event described or offered at a physical locale initiates an application (STEP 205) on the mobile device 105. Using application programming interfaces provided by the device manufacturer and/or the provider of the device operating system, the geolocation and orientation of the device are determined and provided to the application (STEP 210). The geolocation data includes, for example, GPS-based latitude and longitude data. The orientation data includes, for example, a direction (expressed in degrees or radians relative to a real-world coordinate system) and an angle of incline relative to a horizontal (expressed in degrees or radians, either positive, i.e., pointed upwards, or negative, i.e., pointed downwards) and an altitude defined relative to the ground place at that location.

For example, for a user standing at the corner of Hollywood Boulevard and Vine Streets in Los Angeles, facing towards the Pacific Ocean and holding their phone at a slightly tilted angle to aim at a billboard, the geolocation and orientation data may be expressed as a vector such as [34.10150, −118.3269, 270, 30], where the first two values are the latitude and longitude, the third value a direction (due west), and the last a tilt value. Based on this data, a "field of view" of the device may be calculated as an angular extension of the device. The field of view may have a set lateral angular span (e.g., 45 degrees) or the user may set the span to allow for a more accurate or broader field of view, depending on the surroundings. The field of view may also have a defined elevational angular span, thus defining the height of the field of view and a radius to constrain the radial reach of the field of view.

Returning to FIG. 2, once the geospatial information that defines the field of view is determined, it is sent to the central server (STEP 215). Based on the coordinates of the field of view and the geospatial coordinates of the virtual locales stored in the database, one or more virtual locale(s) are identified as potential matches (STEP 220). In some instances a match is determined based on exact match between the coordinates, whereas in other cases a threshold range is applied such that virtual locales deemed "close" are identified. Additional filter criteria may also be considered in qualifying virtual locales such as, the distance from the device to the virtual locale, geographic region, time of day and/or date ranges associated with the virtual locale, meta data associated with the virtual locale, IP verification matching etc. Once a virtual locale is identified, content associated with the virtual locale is retrieved from the content server (STEP 225). The content may be a URL/URI related to the physical locale (e.g., the store's website or a streaming IP camera), an advertisement for a product being offered, a collection of structured data (e.g., menu-driven content), machine-readable instructions (e.g., external smart appliance control), computer code or some combination thereof. The content is transmitted back to the application on the device (STEP 230).

The application then determines the orientation of the device (STEP 235) to detect intersections of the field of view of the device 105 and the various virtual locales within the area of the user (STEP 240).

Once on the device, the list of virtual locales and associated content may be displayed to the user on the display component (STEP 245). In instances in which the content includes more than a single item (e.g., a menu of options), the user may provide navigational commands to the application (STEP 250) to navigate through the list of virtual locales (STEP 255) and have the display be updated in real time based on the input commands. In some cases in which the content includes a URL, selection of that item by the user opens a browser session on the device and requests the web page associated with the URL (STEP 260) for display. The display of the web page may be within the application (effectively replacing the content received from the server) or in a separate browser session, such that the user can return to the application and continue to navigate through the content. In other cases in which the content includes server connectivity instructions or machine executable code, selection of that item by the user establishes a connection with a server (STEP 265) that is related to the physical locale being pointed at thus allowing interaction between the device and the particular computer enabled device identified by the corresponding virtual locale.

Figure 3:
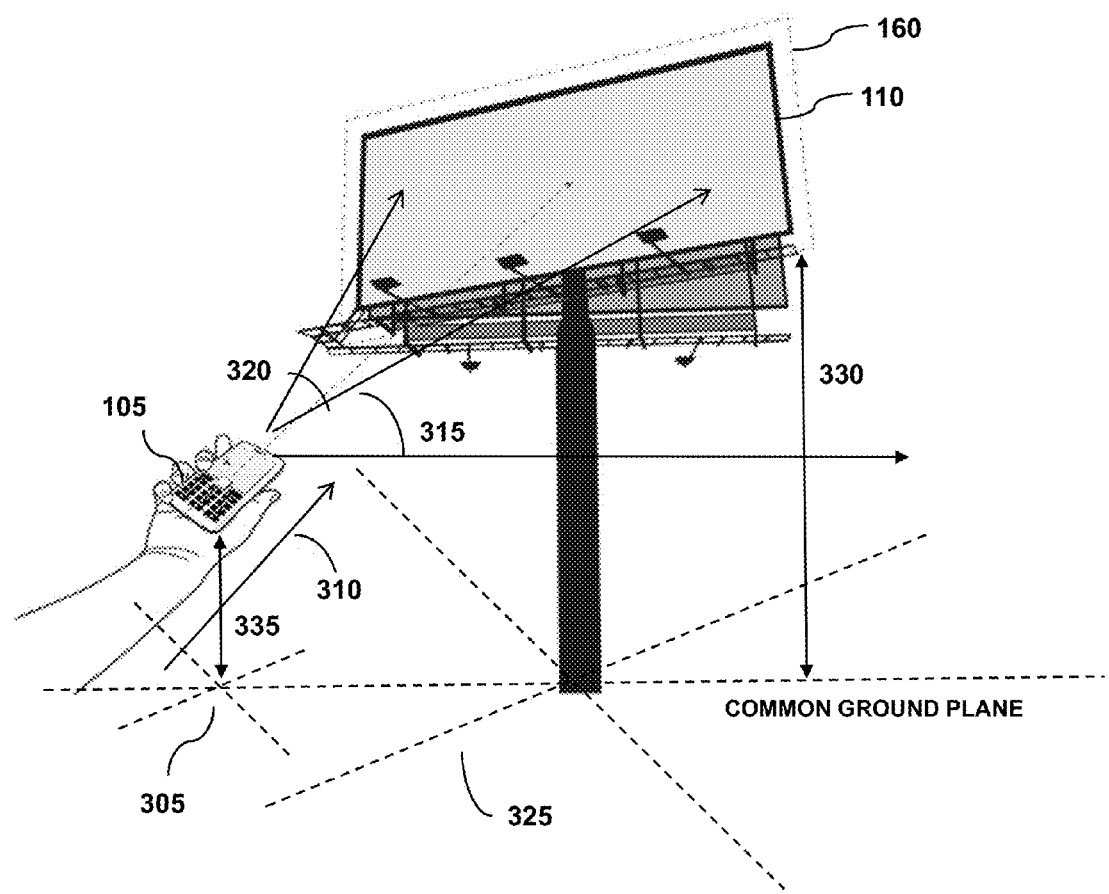
FIG. 3 is an illustration of the interaction between a mobile device and a virtual locale that is associated with a physical locale in accordance with various embodiments of the invention.

FIG. 3 illustrates, in more detail, the techniques used to determine the field of view of the mobile device 105 and how it interacts with the virtual locale(s). Based on the users location, his GPS and/or IPS (if inside a building) coordinates 305 are collected from the device 105. Directional data from the device is also collected, representing the direction in space 310 the user is facing the device. The device also can provide orientation data that describes the "tilt" angle 315 above (or below) the horizontal that the user is holding the device. Using a set lateral angular span 320, the field of view of the device may be determined. The geospatial data describing the field of view of the device, which may include its spatial coordinates 305 and its altitude 335 defined relative to a common ground plane, may be compared to geospatial data describing the virtual locale(s), which may include its real world spatial coordinates 325 and its altitude 330 defined relative to a common ground plane.

In certain cases, a distance between the device 105 and the nearest (or cluster of nearest) virtual locales 160 may be captured and used to evaluate qualifying virtual locales, to influence the size of the field of view, to filter based on distance, and/or to determine the type of virtual locales' content presented to a user. For example if the user were on top of a mountain and pointing at various regions of a city skyline from a mile away, then large virtual locales surrounding the respective neighborhoods are be considered as possible intersections rather than the smaller virtual locales related to individual stores at a street level. Conversely, if the user is standing five feet from a virtual locale then smaller, more precise virtual locales are considered. This distance aware filtering is a powerful aspect to the experience that helps to capture the context aware intent from the user.

Figure 4:
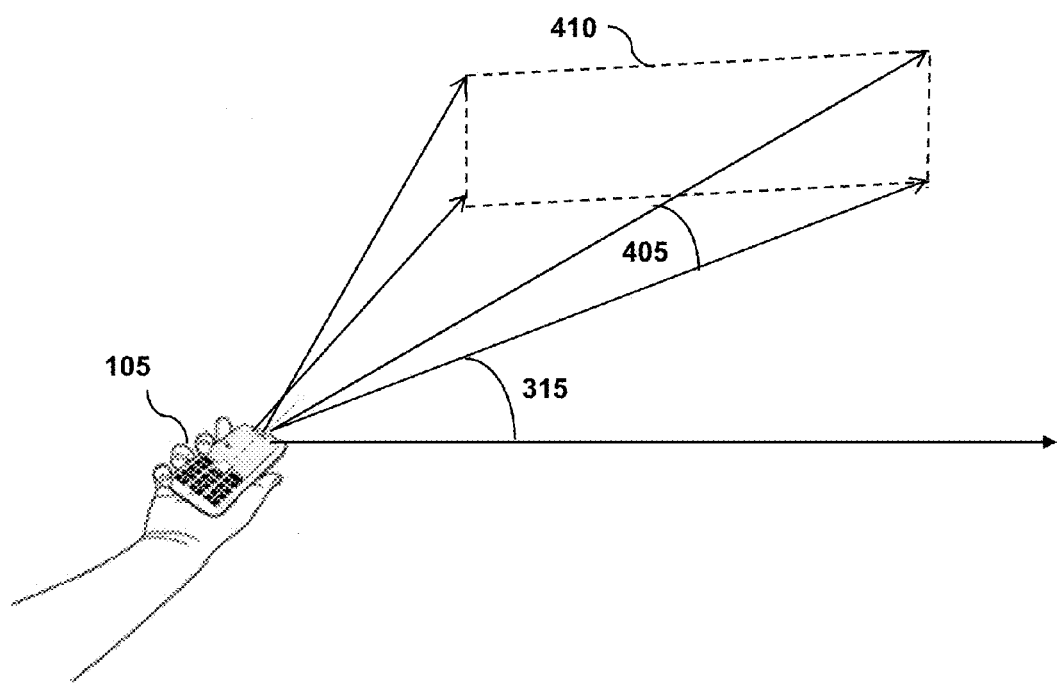
FIG. 4 is an illustration of a field of view of a mobile device based on location and orientation data in accordance with various embodiments of the invention.

In some cases, and as shown in FIG. 4, an additional dimension may be used to define the field of view as a three dimensional shape. In these cases, in addition to the two dimensional planar field of view, an elevational angular span 405 may be specified, thus creating a rectangular projection 410 of the field of view.

Figure 5:
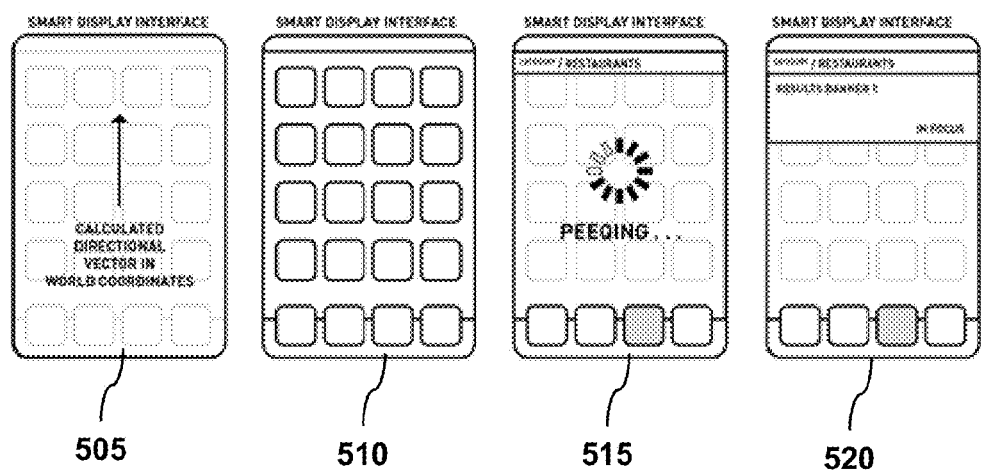
FIG. 5 is a set of exemplary application screens from a mobile application that facilitates the retrieval of an interaction with location-based content in accordance with various embodiments of the invention.
Figure 6:
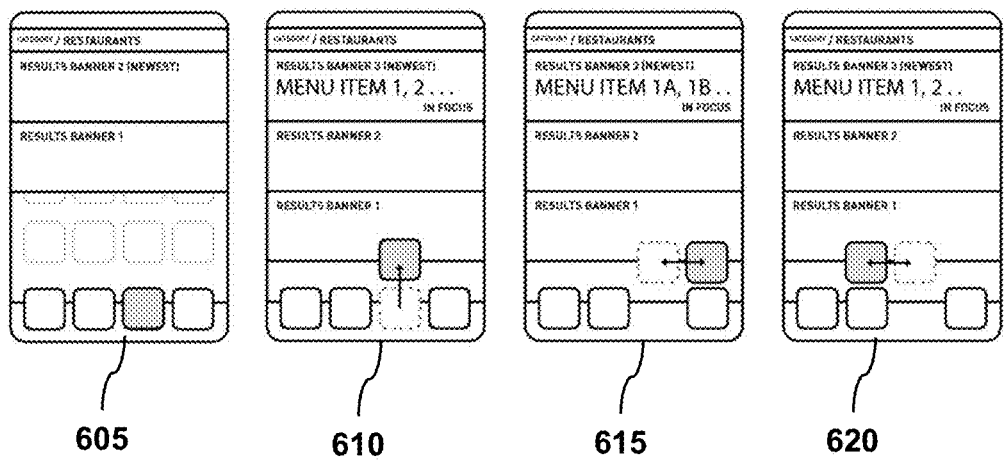
FIG. 6 is a second set of exemplary application screens from a mobile application that facilitates the retrieval of an interaction with location-based content in accordance with various embodiments of the invention.

In response to the identification of one or more virtual locales, content is identified and sent to the device for the user to review, interact with, and manipulate using commands inherent to the device. Referring to FIGS. 5 and 6, a list of executable commands is created and displayed on the display of the smart device in response to the information received from the server.

In some implementations and still with reference to FIG. 5, users of the smart device are able to navigate hierarchical menu options associated with a pre-defined virtual locale. The device 105 is held according to a calculated directional vector (505) which is determined by the orientational detection components of the device itself. In additional, icons representing software applications or optional selections that may be instantiated by the user (510). In some cases, haptic commands may be used to provide input to the device, such as touching an icon, sliding a finger across the screen, pinching the screen, re-orienting the device, moving the device within the world coordinate system or others.

For example, the user interface or interactive mobile web page on the display of a mobile smart device may change based on the intersection of the mobile device calculated directional vector (calculated relative to the device defined in physical world coordinates) with virtual geometry that has been defined relative to the physical world. The specific executable command to be transferred is determined based on past user hyper-link actions giving the most frequently executed commands the highest priority (515). As the user continues to depress the display screen on his device as the directional vector leaves the intersection with the plane (i.e., the user is pointing the phone in another direction), a list item displaying descriptive information is displayed and remains on the smart device (520).

In some cases additional filtering may be applied to the list of virtual locales, content related to the virtual locales, or both. For example filters such as a radius of interest, user-specific metadata, time of day etc. and/or a weighting priority factor may be used, especially in areas of high virtual locale density.

Referring now to FIG. 6, if the directional vector enters and leaves multiple planes while the smart display is continually depressed then a list is created on the display of the smart device with each item containing information relative to the corresponding planes that were intersected (605). As an example, if while continuing to depress the application icon, the user slides their finger up or towards the perceived top of the smart display (610), menu options appear and auto-toggle through a first level of the corresponding navigation menu. Other exemplary motions include sliding the user's finger to the right and back to select the displayed menu item (615), and sliding the user's finger to the left and back (620) to jump up one level in the associated menu hierarchy. In this manner the user of the smart device is able to navigate menus options defined in a hierarchical format as they manipulate the device with respect to the virtual locales associated with the content.

Figure 7:
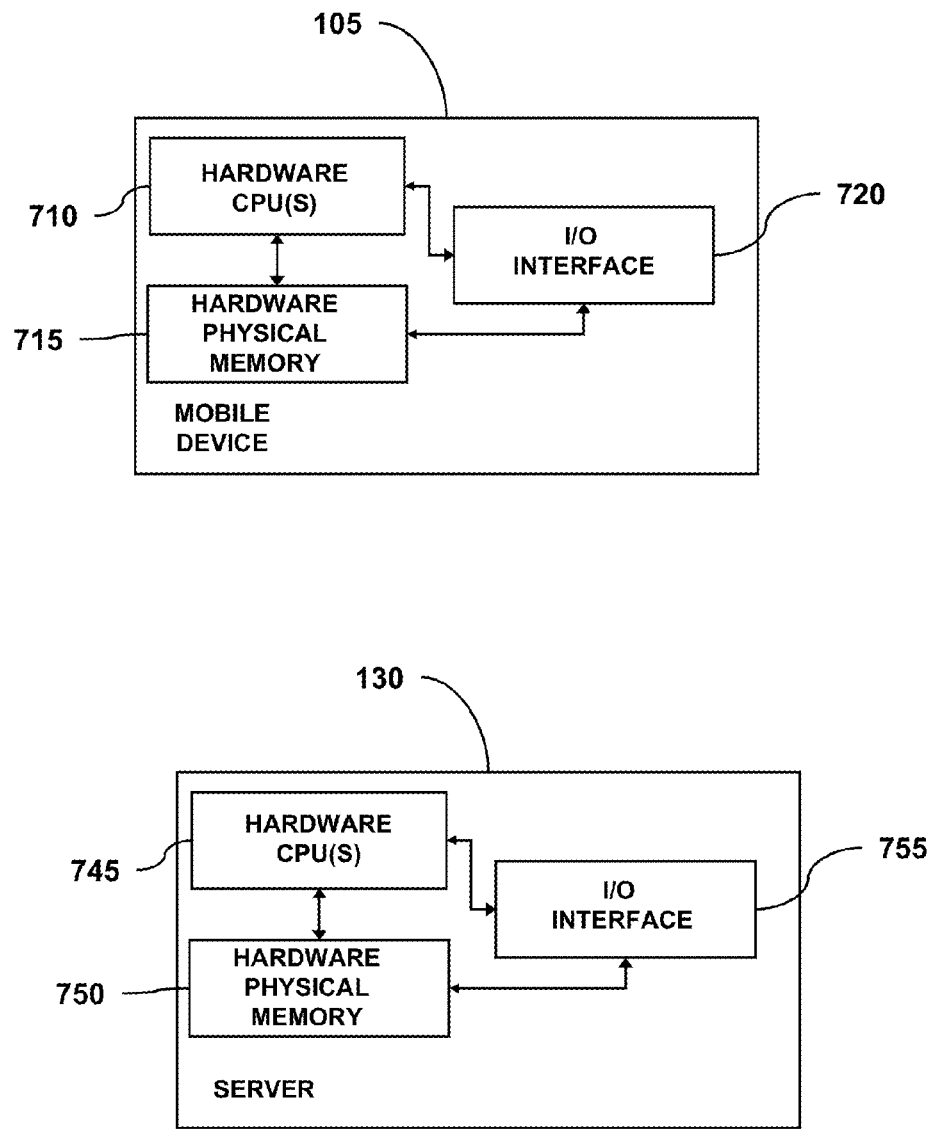
FIG. 7 is a block diagram illustrating one possible architecture for a mobile device and a server in accordance with various embodiments of the invention.

Mobile device 105 and servers 130, 150 and 155 may be implemented in any suitable way. FIG. 7 illustrates an exemplary architecture for a mobile device 105 and a server 130 (for example, any of servers 130, 150 or 155) that may be used in some embodiments. The mobile device 105 may include hardware central processing unit(s) (CPU) 710, operatively connected to hardware/physical memory 715 and input/output (I/O) interface 720. Exemplary server 135 similarly comprises hardware CPU(s) 745, operatively connected to hardware/physical memory 750 and input/output (I/O) interface 755. Hardware/physical memory may include volatile and/or non-volatile memory. The memory may store one or more instructions to program the CPU to perform any of the functions described herein. The memory may also store one or more application programs.

Exemplary mobile device 105 and exemplary server 135 may have one or more input and output devices. These devices can be used, among other things, to present a user interface and/or communicate (e.g., via a network) with other devices or computers. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Although examples provided herein may have described the servers as residing on separate computers, it should be appreciated that the functionality of these components can be implemented on a single computer, or on any larger number of computers in a distributed fashion.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only. The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish a relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

In some embodiments the functions may be implemented as computer instructions stored in portions of a computer's random access memory to provide control logic that affects the processes described above. In such an embodiment, the program may be written in any one of a number of high-level languages, such as FORTRAN, PASCAL, C, C++, C#, Java, javascript, Tcl, or BASIC. Further, the program can be written in a script, macro, or functionality embedded in commercially available software, such as EXCEL or VISUAL BASIC. Additionally, the software may be implemented in an assembly language directed to a microprocessor resident on a computer. For example, the software can be implemented in Intel 80×86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

Variations, modifications, and other implementations of what is described herein will occur to those of ordinary skill in the art without departing from the spirit and the scope of the invention as claimed. The computer system may include a general purpose computing device in the form of a computer including a processing unit, a system memory, and a system bus that couples various system components including the system memory to the processing unit.

The invention claimed is:

1. A method for delivering geographically-relevant content to a mobile device, the method comprising the steps of:
   receiving geolocation data from the mobile device;
   receiving orientation data from the mobile device, the orientation data comprising a directional orientation and a vertical angle of the mobile device;
   based on the geolocation data and the orientation data, identifying an angular field of view relative to a real-world coordinate system as the mobile device is pointed at a physical locale;
   transmitting geospatial data describing the field of view to a central server;
   receiving, from the server, structurally-organized content associated with the physical locale based on (i) detected spatial intersections between the geospatial data describing the field of view and geospatial data of the locale and its position in a physical world, including a latitude, a longitude and a height wherein the geospatial data of the locale may change based on changes in at least one of the physical environment of the locale and changes to external data describing the physical environment and (ii) comparisons between metadata associated with the locale and the content, wherein the geospatial data of the locale are expanded beyond physical dimensions of the locale as to include space between physical locales but not to overlap with other virtual locales, wherein the expansion of the geospatial data of the locale is based, at least in part, on a location of the mobile device relative to the physical locale, and wherein the expansion of the geospatial data of the locale is further based on payment for the expansion by an owner of a business located at the locale;

receiving input signals representing haptic interactions with the mobile device; and iteratively updating content displayed on the device based on the input signals and detected changes in the geolocation and orientation data.

2. The method of claim 1 wherein the physical locale comprises multiple sub-locales, and wherein the received structurally-organized content comprises information related to each of the sub-locales such that the haptic interactions direct navigation of the content on the mobile device among information related to each of the sub-locales.

3. The method of claim 1 wherein the structurally-organized content is organized hierarchically, and wherein parent nodes at a first level in the hierarchy include top-level content for each of the sub-locales, and child nodes at levels subordinate to the first level include subcontent associated with the sub-locales.

4. The method of claim 1 wherein the displayed content is a subset of the received content.

5. The method of claim 1 wherein the physical locale comprises a two-dimensional plane.

6. The method of claim 1 wherein the physical locale comprises a three-dimensional volume and the spatial intersection comprises an volumetric intersection of the geospatial data of the field of view and the geospatial data of the locale.

7. The method of claim 1 wherein the physical local comprises at least one of a building, a billboard, a storefront, a landmark, or a naturally occurring landscape element.

8. The method of claim 1 wherein the geolocation data further comprises indoor positional system data.

9. The method of claim 1 wherein the structurally-organized content comprises a traversable menu of content, and wherein the haptic interactions cause content elements to be selected from the menu.

10. The method of claim 1 wherein the haptic interactions comprise one or more of sliding a finger vertically along a face of the mobile device, sliding a finger horizontally along the face of the mobile device, touching and, after a specified time duration, removing a finger from the face of the mobile device, or maintaining contact between a finger and the face of a mobile device for a period of time greater than the specified time duration.

11. A system for delivering geographically-relevant content to a mobile device, the system comprising:
 a processor for executing computer-executable instructions; and
 a memory for storing the computer-executable instructions, that when executed by the processor implements a content delivery application, wherein the content delivery application identifies physical locales and displays structured content associated with the physical locale by:
receiving geolocation data from the mobile device;
receiving orientation data from the mobile device, the orientation data comprising a directional orientation and a vertical angle of the mobile device;
based on the geolocation data and the orientation data, identifying an angular field of view relative to a real-world coordinate system as the mobile device is pointed at a physical locale;
transmitting geospatial data describing the field of view to a central server;
receiving, from the server, structurally-organized content associated with the physical locale based on (i) detected spatial intersections between the geospatial data describing the field of view and geospatial data of the locale and its position in a physical world, including a latitude, a longitude and a height wherein the geospatial data of the locale may change based on changes in at least one of the physical environment of the locale and changes to external data describing the physical environment and (ii) comparisons between metadata associated with the locale and the content, wherein the geospatial data of the locale are expanded beyond physical dimensions of the locale as to include space between physical locales but not to overlap with other virtual locales, wherein the expansion of the geospatial data of the locale is based, at least in part, on a location of the mobile device relative to the physical locale, and wherein the expansion of the geospatial data of the locale is further based on payment for the expansion by an owner of a business located at the locale;
receiving input signals representing haptic interactions with the mobile device; and
iteratively updating content displayed on the device based on the input signals and detected changes in the geolocation, and orientation data.

12. The system of claim 11 further comprising a data storage device, operating on the server, for storing the structurally organized content.

13. The system of claim 12 wherein the data storage device further stores the geospatial coordinates associated with the physical locales.

14. The system of claim 11 wherein the physical locale comprises multiple sub-locales, and wherein the received structurally-organized content comprises information related to each of the sub-locals such that the haptic interactions direct navigation of the content on the mobile device among information related to each of the sub-locales.

15. The system of claim 14 wherein the geospatial data further comprises indoor positional system data.

16. The system of claim 14 wherein the structurally-organized content is organized hierarchically, and wherein parent nodes at a first level in the hierarchy include top-level content for each of the sub-locales, and child nodes at levels subordinate to the first level include subcontent associated with the sub-locales.

17. The system of claim 11 wherein the structurally-organized content comprises a traversable menu of content, and wherein the haptic interactions cause content elements to be selected from the menu.

18. The system of claim 11 wherein the displayed content is a subset of the received content.

19. The system of claim 11 wherein the haptic interactions comprise one or more of sliding a finger vertically along a face of the mobile device, sliding a finger horizontally along the face of the mobile device, touching and, after a specified time duration, removing a finger from the face of the mobile device, or maintaining contact between a finger and the face of a mobile device for a period of time greater than the specified time duration.

20. An article of manufacture having non-transitory computer-readable program portions physically stored thereon for delivering content to a mobile device, the article comprising computer-readable instructions for:

receiving geolocation data from the mobile device;

receiving orientation data from the mobile device, the orientation data comprising a directional orientation and a vertical angle of the mobile device;

based on the geolocation data and the orientation data, identifying an angular field of view relative to a real-world coordinate system as the mobile device is pointed at a physical locale;

transmitting geospatial data describing the field of view to a central server;

receiving, from the server, structurally-organized content associated with the physical locale based on (i) detected spatial intersections between the geospatial data describing the field of view and geospatial data of the locale and its position in a physical world, including a latitude, a longitude and a height wherein the geospatial data of the locale may change based on changes in at least one of the physical environment of the locale and changes to external data describing the physical environment and (ii) comparisons between metadata associated with the locale and the content, wherein the geospatial data of the locale are expanded beyond physical dimensions of the locale as to include space between physical locales but not to overlap with other virtual locales, wherein the expansion of the geospatial data of the locale is based, at least in part, on a location of the mobile device relative to the physical locale, and wherein the expansion of the geospatial data of the locale is further based on payment for the expansion by an owner of a business located at the locale;

receiving input signals representing haptic interactions with the mobile device; and iteratively updating content displayed on the device based on the haptic interactions and detected changes in the geolocation, and orientation data wherein the displayed content is a subset of the received content.

\* \* \* \* \*